May 3, 1938.　　J. Y. TAYLOR ET AL　　2,116,163
EDUCATIONAL DEVICE
Filed July 30, 1934　　5 Sheets-Sheet 1
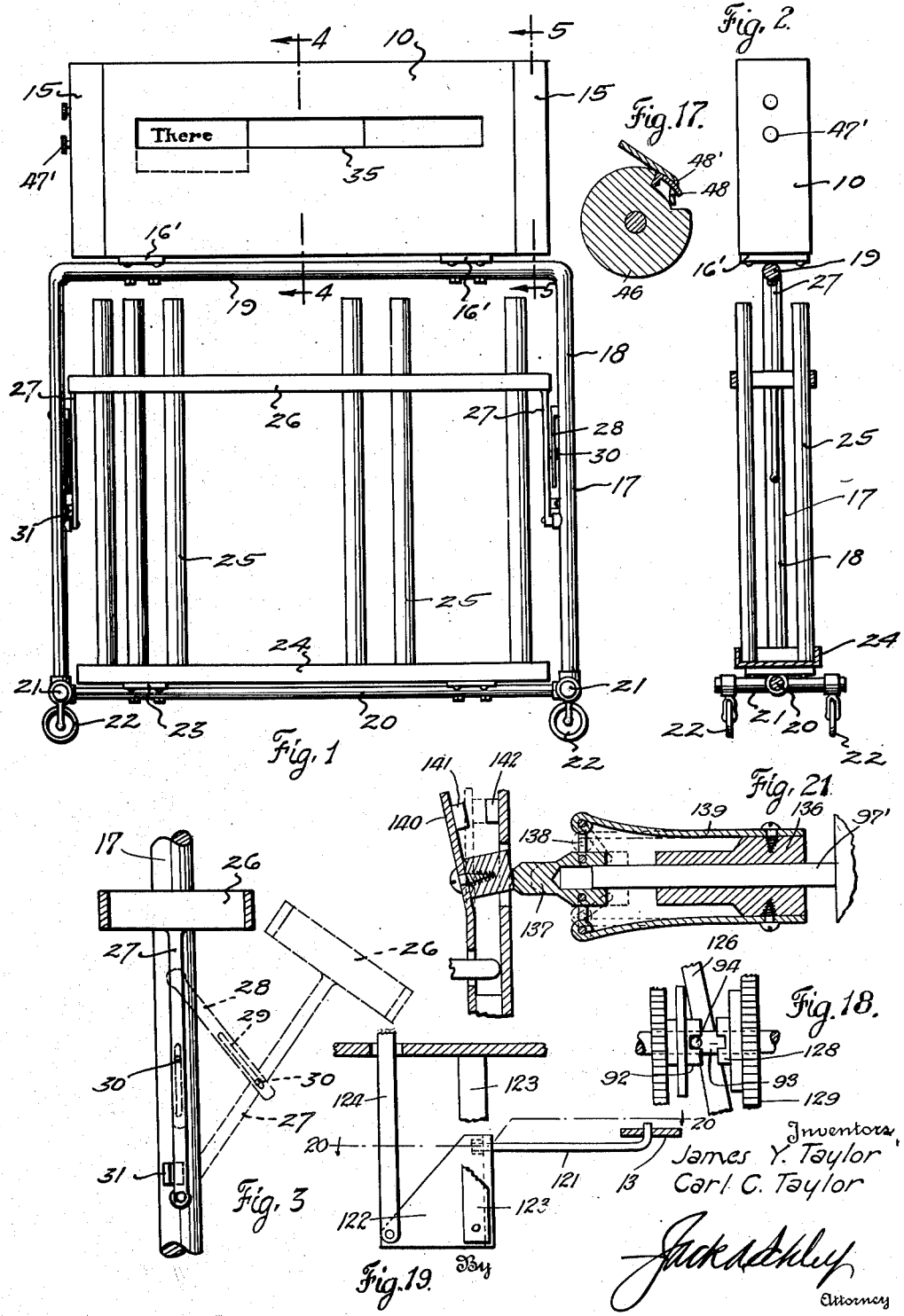

May 3, 1938. J. Y. TAYLOR ET AL 2,116,163
EDUCATIONAL DEVICE
Filed July 30, 1934   5 Sheets-Sheet 2

Inventors
James Y. Taylor
Carl C. Taylor

By Jack Ashley
Attorney

May 3, 1938.                J. Y. TAYLOR ET AL                2,116,163
                              EDUCATIONAL DEVICE
                    Filed July 30, 1934            5 Sheets-Sheet 3
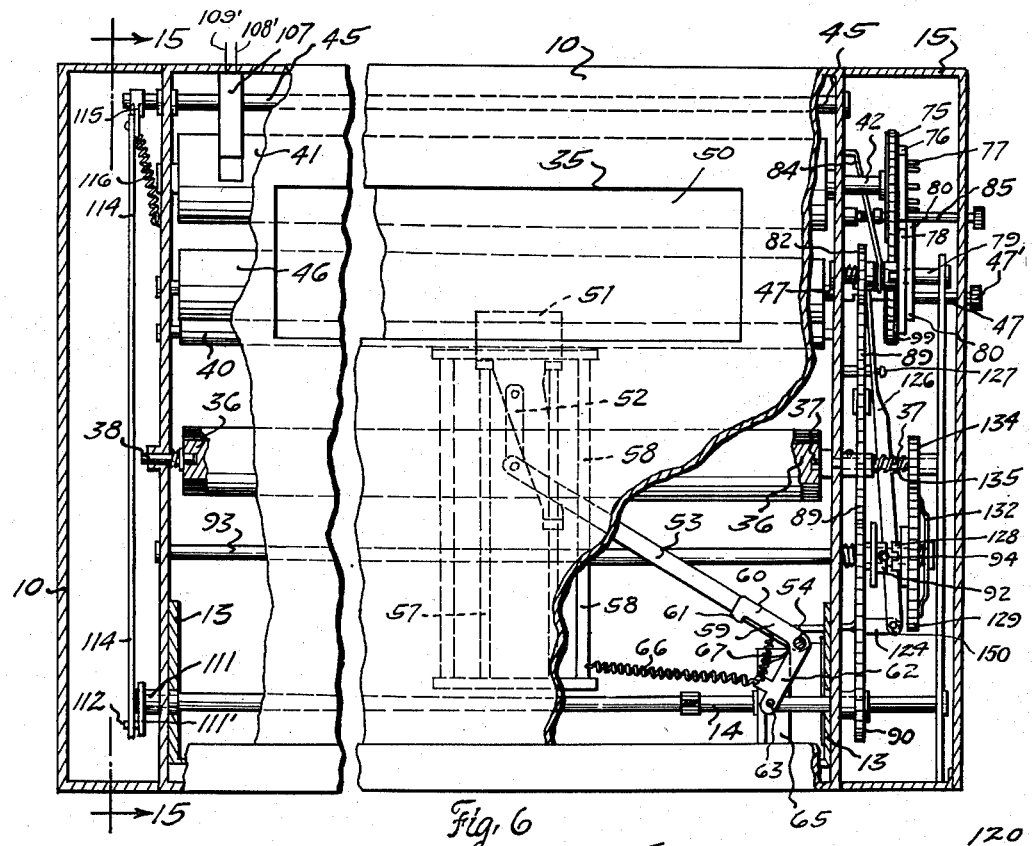
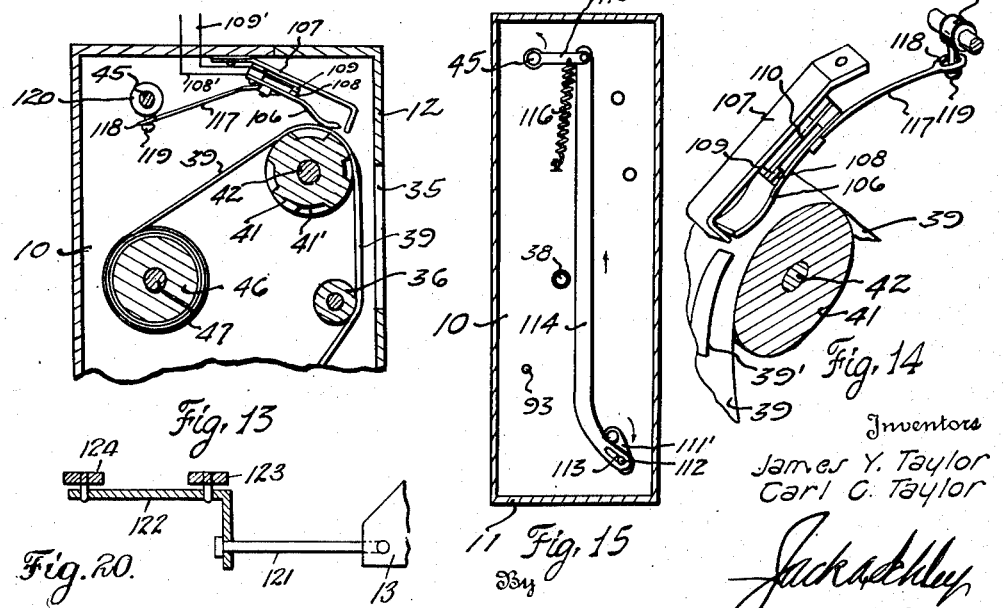
Inventors
James Y. Taylor
Carl C. Taylor
By Jack Ashley
Attorney May 3, 1938.  J. Y. TAYLOR ET AL  2,116,163
EDUCATIONAL DEVICE
Filed July 30, 1934    5 Sheets-Sheet 4

Inventors
James Y. Taylor
Carl C. Taylor

Jack A. Ashley
Attorney

May 3, 1938.  J. Y. TAYLOR ET AL  2,116,163
EDUCATIONAL DEVICE
Filed July 30, 1934   5 Sheets-Sheet 5

Inventors
James Y. Taylor
Carl C. Taylor

Attorney

Patented May 3, 1938

2,116,163

UNITED STATES PATENT OFFICE 2,116,163

EDUCATIONAL DEVICE

James Y. Taylor and Carl C. Taylor, Brownwood, Tex., assignors to Educational Laboratories, Inc., Brownwood, Tex., a corporation of Texas Application July 30, 1934, Serial No. 737,630

3 Claims. (Cl. 35—35)

This invention relates to new and useful improvements in educational devices.

One object of the invention is to provide an improved device for educational purposes, especially for the teaching of reading and directing eye movements, and involving certain improvements upon our Letters Patent No. 1,918,298 dated July 18, 1933.

An important object of the invention is to provide an exhibiting machine having an elongated window in its front wall and having a traveling strip or roll with indicia printed thereon mounted on rollers within the machine so that the entire strip may be displayed, line by line, through the window, said front wall being hinged to swing outwardly to make for easy accessibility to the interior, the swinging wall associated with mechanism for automatically stopping the forward travel and reversing the travel of the strip when the door is opened.

Another object of the invention is to provide an exhibiting machine having an elongated window through which a line of indicia is displayed, said window being closed by a plurality of panels which are operated successively to exhibit sequent portions of the line, thereby forcing the observer's eyes to follow the display, and means for holding any one of the panels in a closed or open position while the remaining panels are operating.

A further object of the invention is to provide an improved exhibiting machine having an elongated window in its front wall and having a strip or roll with indicia or symbols printed thereon, said roll being so mounted that the entire strip may be displayed through the window, line by line, and means for automatically stopping the travel of the strip, said means being arranged so as to operate only when one of the lines of indicia is visible through the window and will not operate when the strip is traveling to move the next line into view.

Another object of the invention is to provide an improved educational device for displaying a strip or roll of indicia, line by line, said device being mounted on a movable stand in which the rolls of indicia may be stored when not in use, said stand also making for easy handling of the device in a class room, or other place.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a front elevation of an educational device constructed in accordance with the invention, Figure 2 is a side elevation, showing the supporting stand in section, Figure 3 is a detail of roll supporting frame.

Figure 6 is a front view, partly in elevation and partly in section,

Figure 4:
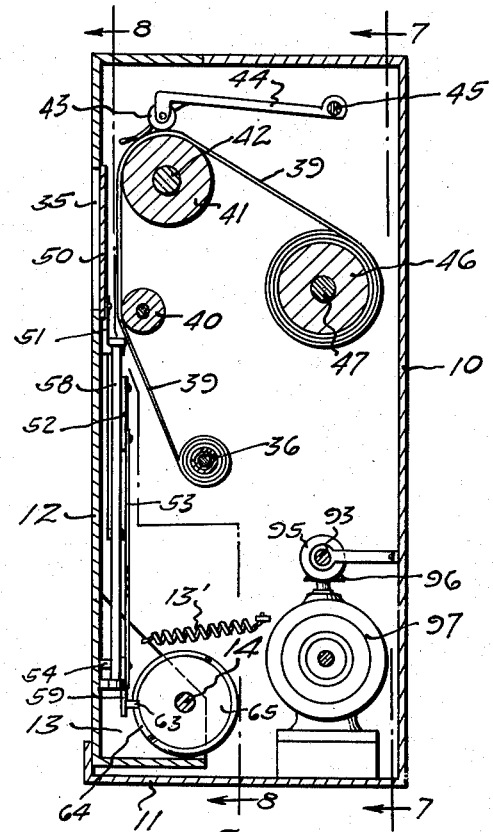
Figure 4 is a transverse, vertical sectional view of the device, taken on the line 4—4 of Figure 1.
Figure 10:
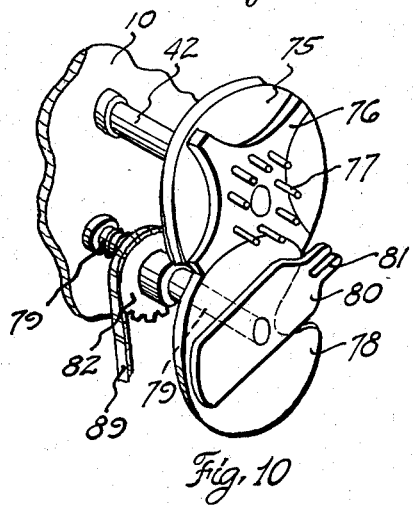
Figure 16:
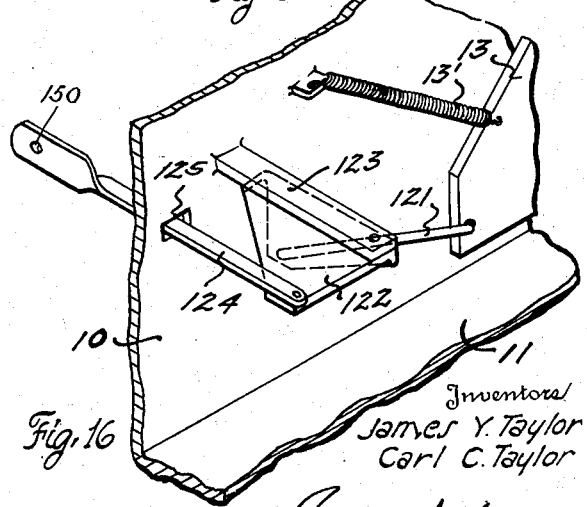
Figure 7:
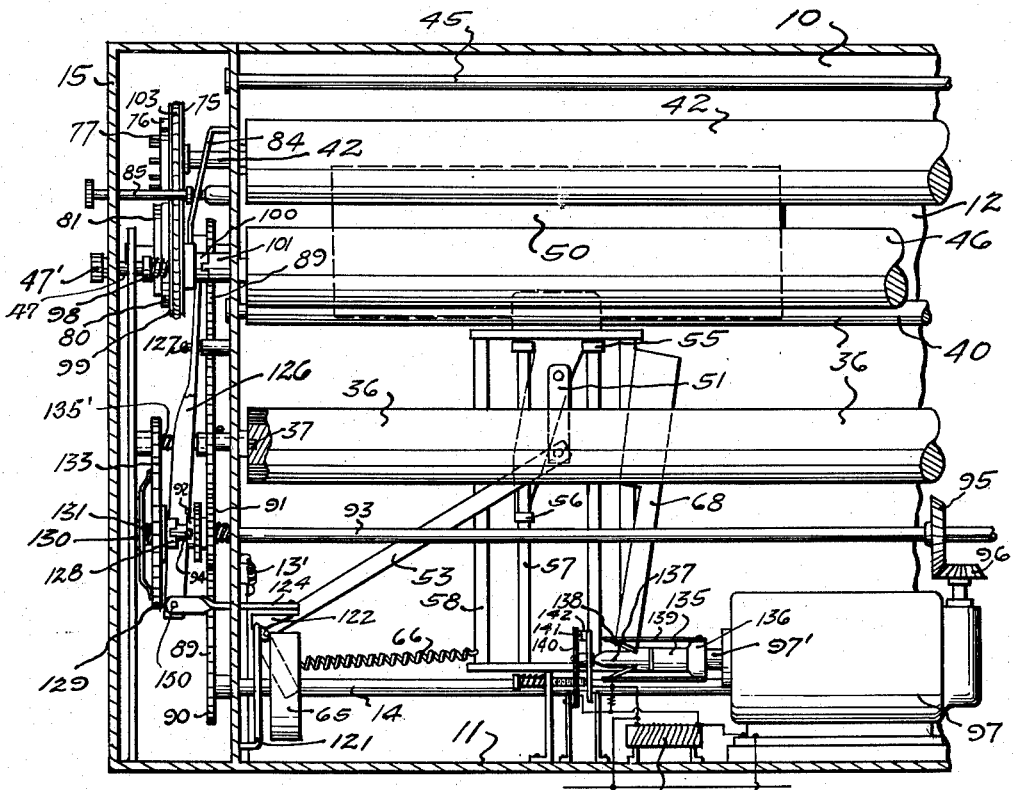
Figure 11:
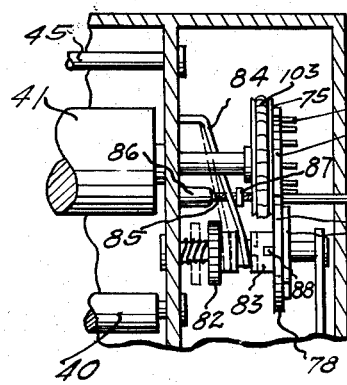
Figure 12:
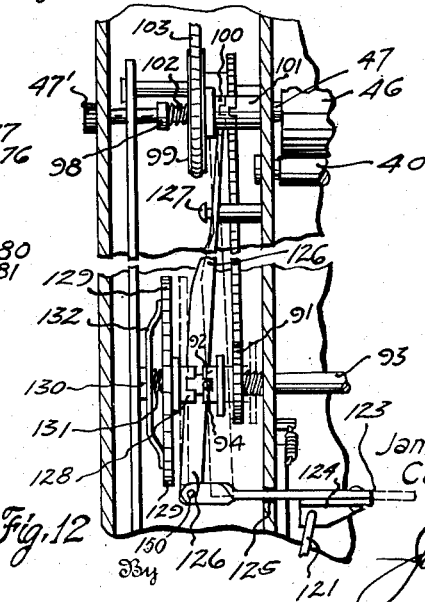
Figures 8, 9:
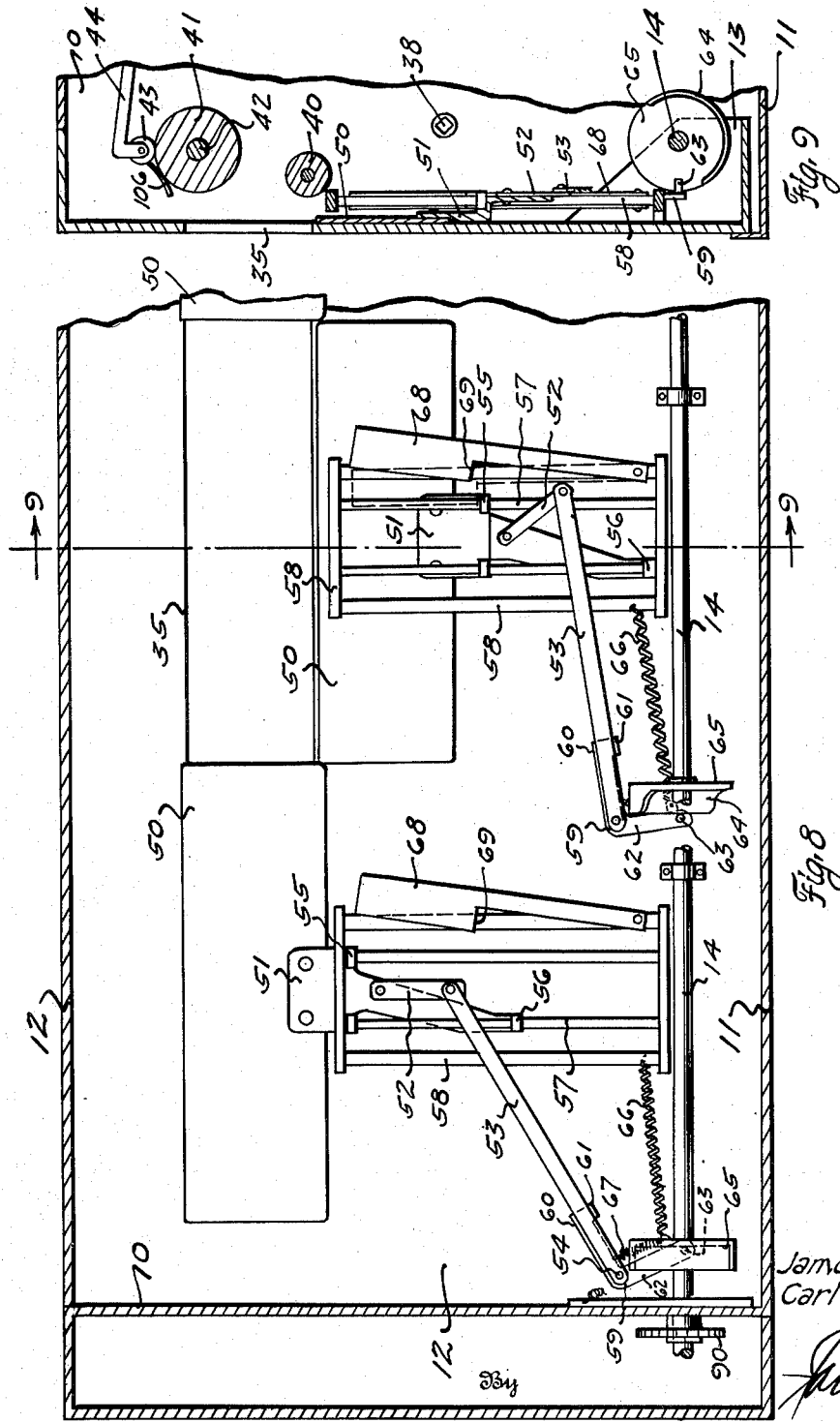

Figure 7 is a partial, longitudinal, sectional view, taken on line 7—7 of Figure 4 and showing one end of the device, Figure 8 is a partial longitudinal sectional view, taken on line 8—8 of Figure 4 and showing the display panel mechanism, Figure 9 is a transverse, vertical sectional view taken on the line 9—9 of Figure 8, Figure 10 is a perspective view of the spacer roller drive, Figure 11 is a sectional detail of the same, Figure 12 is a sectional detail of the drive mechanism, Figure 13 is a detail of the cut-off switch, Figure 14 is a perspective of the same, Figure 15 is a reduced transverse sectional view taken on line 15—15 of Figure 6, showing the roller shaft control bar, Figure 16 is a perspective detail showing the connection between the hinged front wall of the device and the mechanism shown in Figure 15, Figure 17 is a detail of the take up roller showing its connection with the strip, Figure 18 is a fragmentary enlarged view of the clutch details shown in Figure 6, Figure 19 is a fragmentary partial sectional view of the structure shown in Figure 16, Figure 20 is a sectional view taken on line 20—20 of Figure 19 looking in the direction indicated by the arrows; and Figure 21 is an enlarged sectional view of the speed control means shown in Figure 7.

In the drawings, the numeral 10 designates an upright casing having a bottom 11. The front wall 12 of the casing has rearwardly extending flanges 13 at its lower end and these flanges are pivotally mounted on a longitudinal shaft 14 whereby the front wall may be swung. Springs 13' having one end secured to the flanges and the other end secured to the end walls normally hold the front wall in a closed position. The shaft 14 extends the entire length of the casing and has its ends supported in the end walls of the casing. The casing has end sections 15 secured thereto and these sections are preferable removable as will be hereinafter described.

The casing is supported on, and secured to transverse bars 16' which are fastened on the upper end of a stand 17. The stand is shown constructed of vertical side rods 18 which are connected at their upper ends by a longitudinal horizontal rod 19 preferably made integral with the side rods. The lower ends of the rods 18 are connected by a horizontal rod 20, and short transverse rods 21 extend forwardly and rearwardly of the rod 20. Each rod 21 carries a pair of rollers 22 whereby the stand is readily movable.

A pair of transverse bars 23 are secured to the upper side of the lower connecting rod 20 and these bars support a tray 24 which is fastened thereto. The rolls 25 on which indicia are printed and which are used in the device, as will be hereinafter explained, have their lower ends resting on the tray 24. The upper ends of the rolls are held in position in the tray by a rectangular frame 26 which is substantially the same size as the tray. The frame is supported by arms 27 which are pivoted to the vertical rods 18 of the stand 17, and it is obvious by observing Figure 3, the frame 26 may be swung outwardly as shown in dotted lines.

To limit the outward swing of the frame, a short arm 28 is pivoted to each vertical rod 18 adjacent each arm 27. Each arm 28 has a slot 29 near its outer end and a pin 30 on each arm is engaged in the slot. It is obvious that with this arrangement, the swing of the frame 26 is limited. Rearward swinging of said frame is prevented by a stop 31 secured to the vertical rods 18 of the frame. The rolls are set vertically in the tray and are held therein by the frame 26. When it is desired to remove a roll it is only necessary to swing the frame outwardly and any of the rolls are readily accessible. By providing space in the stand for the rolls it is clear that all the rolls are always at hand, thereby making for convenience.

A horizontal, elongated sight opening or window 35 is provided in the swinging front wall of the casing near its top. Within the casing a removable supply roller 36 is mounted. One end of the supply roller is engaged by the square end of a stub shaft 37 while the other end is supported by a spring tensioned sliding stud 38. The shaft and stud are journaled in opposite end walls of the casing 10. The roller 36 carries a strip of cloth, paper, or other suitable material 39 on which is printed a series of sentences, mathematical symbols, or other educational indicia.

The strip 39 is passed upwardly and forwardly of an idler 40 which is journaled in the end walls of the casing, and then over a spacer roller 41 which is mounted on a shaft 42 also journaled in the end walls above the window 35. A central friction roller 43 is carried by an arm 44 which is secured to a longitudinal horizontal shaft 45 which is journaled in the end walls at the upper rear end of the casing. The friction roller rides on the spacer roller 41 to hold the strip tightly against the same.

After passing over the spacer roller the strip is demountably fastened to a winding roller 46 which is secured on a shaft 47 journaled in the end walls. The fastening means is shown in detail in Fig. 17. The strip has an eye 48' in its end and this eye is engaged by a hook 48 on the winding roller 46. The hook is so positioned that when the roller rotates in a clockwise direction, the engagement of the hook in the eye 48' winds the strip around said roller. When the roller turns in a counter-clockwise direction, as will be hereinafter explained, the hook automatically disengages from the eye.

It will be seen that the idler 40 and the spacer roller 41 hold a portion of the strip 39 in close proximity to the sight opening or window 35 and that portion is clearly visible therethrough. (Figs. 1, 4 and 6). The indicia, such as words or sentences, printed on the strip or chart 16 are so spaced lengthwise of the strip that each line may be successively and individually displayed through the window responsive to a step-by-step actuation of the spacer roller. The takeup roller shaft 47 is provided with a knob 47' at its outer end, whereby the strip may be properly adjusted when first placed on the rollers.

For exhibiting the indicia of each line in sequence, and thereby forcing the observer's eyes to travel from left to right, a trio of doors or panels 50 are provided. Each panel is slightly wider than the window and is of such a length as to cover substantially one-third of the length of said window. The panels are arranged to slide vertically and when all of the panels are in a raised position, it is obvious that the entire window is closed and the indicia on the strip within the casing are not visible to the observer. The operating mechanism of each panel is the same and a description of one will suffice for all.

Each panel has a depending bracket 51 (Figs. 4 and 8) secured to its lower rear end, and a link 52 has its upper end pivotally secured to said bracket. The lower end of the link has a pivotal connection with the upper end of an elongated actuating bar 53, which has its other end pivoted on a pin 54 which extends inwardly from the swinging front wall 12 of the casing. It is obvious that when the bar 53 is swung downwardly, the panel is lowered through the medium of the link 52 and bracket 51. The bracket has a pair of inwardly extending ears 55 at its upper end and a similar ear 56 at its lower end. These ears engage around vertical guide rods 57 which are mounted in a frame 58 rigidly secured to the inner side of the front wall 12. When the arm 53 is swung to lower the panel, the engagement of the ears with the guide rods maintains vertical alinement of the sliding panel.

For swinging the actuating bar 53, a bell crank lever 59 is pivotally mounted on the pin 54 adjacent the bar. The upper arm 60 of the lever is normally parallel to and extends alongside the bar and this arm has a lug 61 at its lower outer end which engages the underside of said bar. The other arm 62 of the bell crank has a roller 63 which is held in constant engagement with the edge of a peripheral flange 64 on a cam 65 by a coiled spring 66. The cam is secured on the rotatable shaft 14 which is journaled in the end walls and on which the swinging front wall 12 of the casing is pivoted. The arm 62 of the bell crank is connected to the actuating bar 53 by a coiled spring 67 which has one end fastened to the lower end of said bar and the other end secured to an ear on the outer end of the arm.

The flange 64 of the cam extends only one third around the periphery of said cam. In Figure 8, we have shown two of the three panels, the panel on the left being in a raised or closed position and the other in a lowered or open position. By observing the position of the cams controlling the operation of the panels it is obvious that when the panel is raised the roller 63 on the bell crank arm 62 is not engaging the flange 64 but is engaging the edge of the cam itself. As the cam rotates to the point where the flange strikes the roller, the arm 62 of the bell crank is swung away from said cam to the position shown on the lowered panel in Figure 8. The outward swinging of the arm 62 swings the arm 60 downwardly and at the same time the spring 67 which connects the bell crank to the actuating arm 53 pulls said arm downwardly, whereby the panel is lowered. The panel remains in this position until the roller 63 rides off the flange of the cam, at which time the parts return to the position of the left hand panel in Figure 8. Since there are three panels, it is pointed out that three cams 65 are required. The flanges of the cams are so positioned that when the panel on the left Figure 1 is open or in a lowered position, the other two panels are closed, or raised, because the rollers 63 of the bell cranks 59 controlling these latter two panels are riding the edge of the cam and are not engaging the flanges. The cams positively control the vertical travel of the panels.

When the left panel is raised to close its portion of the window, due to the roller 63 of its bell crank riding off the flange 64, the middle panel is lowered because at this time the roller 63 of its bell crank rides onto the flange 64 and is swung. The panel on the right remains in a raised, or closed position because its roller is still riding the edge of the cam. When the middle panel closes due to the swinging of its bell crank, the third cam comes into action lowering the panel on the right. When this panel raises, the operation is repeated. Thus, it is seen that the line of indicia visible through the window 35 is displayed a portion at a time from left to right and the eyes of the observer are forced to travel from left to right and must make definite lateral fixations.

At times, it might be desired to operate only two of the panels keeping the third in either a raised or lowered position. For this purpose, a swinging latch bar 68 has its lower end pivoted to each frame 58 at one side thereof (Figure 8). The bar is of such height that when swung inwardly with the panel in a raised position, the upper edge of said bar will engage beneath the ears 55 of the bracket and will prevent downward movement of said panel. This will also prevent swinging of the bar 53, but due to the coiled spring 67 connecting the bar with the bell crank 59, the operation of the crank and cam 65 will not be interfered with. When the latch prevents movement of the panel and actuating arm, the bell crank will swing in the usual way and the spring 67 will expand to compensate for the movement. When it is desired to lock the panel in a lowered position, said panel is lowered and the latch is swung inwardly so that a shoulder 69 on said latch will engage the upper edge of the ear 55 on the bracket 51. This will prevent upward movement of said panel. When the panel is lowered, the actuating bar 53 is swung downwardly. The downward swinging of the arm will swing the bell crank 59 due to the engagement of the underside of said bar with the lug 61 on the arm 60 of the crank. Thus, the arm 62 of the bell crank will be swung and held out of the path of the flange 64 of the cam 65. It is obvious that any or all of the panels may at any time and without interfering with the mechanism be held against operation in either an open or closed position.

When each panel has been operated once and one line of indicia on the strip has been displayed, it is necessary to bring the next line of indicia into alinement opposite the window 35, whereby upon the next operation of the panels, this line will be visible to the observer. The lines of indicia on the strip 39 are spaced so that one quarter revolution of the spacer roller 41 will bring the next line opposite the window.

Figure 5:
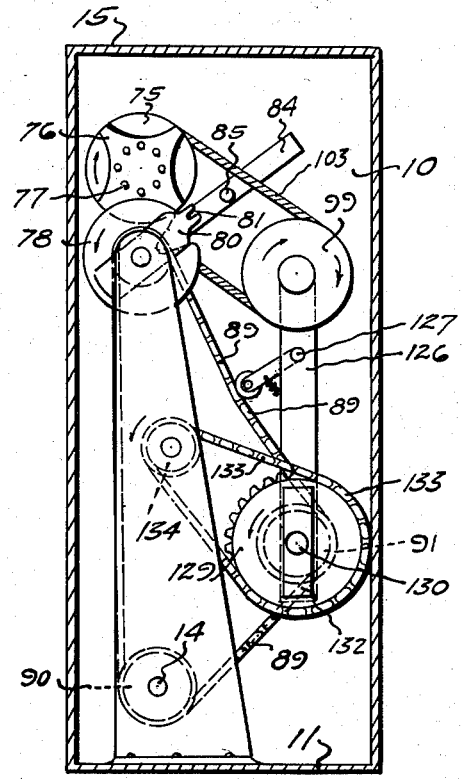
Figure 5 is a transverse, vertical sectional view of the same, taken on the line 5—5 of Figure 1.

For actuating the spacer roller one quarter of a turn after the successive operation of the three panels 50, one end of the shaft 42 of said roller is extended through the end wall of the casing (Figs. 6 and 10). The end of this shaft has a pulley 75 secured thereto and a star wheel 76 is made integral with the outer face of the pulley. The star wheel is provided with elongated horizontal pins 77 which are positioned radially of said wheel. The outer edge of the star wheel rides on the outer periphery of a cam disk 78, which is mounted on a stub shaft 79 secured to and extending outwardly from the end wall of the casing beneath the shaft 42. An operating member 80 is secured to the outer face of the cam disk and the outer end of this member extends beyond the edge of the cam disk. A slot 81 is provided in this outer end and is alined to engage the horizontal pins 77 of the star wheel when the cam disk is rotated. (Figs. 5 and 10). As the cam disk rotates, the slot 81 will engage one of the pins and thereby carry the star wheel around one quarter of a turn. The star wheel is prevented from rotating more than one quarter of a revolution at a time by the friction of the star wheel against the periphery of the cam disk. It is obvious that the disk 78 must make one complete revolution each time the star wheel rotates one quarter of a turn.

For driving the cam disk 78, a gear 82 is loosely mounted on the stub shaft 79 and this gear has a clutch 83 made integral therewith, (Fig. 11) whereby the clutch and gear may be slid on the shaft. A forked bar 84 is pivoted on a threaded pin 85 and has one end forked to engage the clutch 83. The pin 85 is threaded in a boss 86 which extends outwardly from the end wall of the casing and the pin has a collar 87 secured thereon for preventing displacement of the bar 84 from said pin (Figs. 5, 7, and 11). By screwing and unscrewing the pin within the boss the bar is swung to slide the clutch 83 and gear 82 on the stub shaft 79.

The cam disk has a lug 88 which is engaged by the clutch 83 when said clutch is in an outward position. When the bar 84 is swung said clutch is slid inwardly, and the clutch is disengaged from the lug, whereby no motion is transmitted to the cam disk. See Fig. 11.

For driving the gear 82, an endless chain 89 is passed over said gear and downwardly around a gear 90 which is secured to one end of the cam shaft, 14, which is extended through one of the end walls of the casing. The chain is then passed around a driving gear 91 and back to the gear 82. The driving gear is made integral with a clutch 92 which is slidably mounted on a drive shaft 93. The shaft has a pin 94 which is normally engaged by the clutch, whereby a driving connection between the shaft and driving gear is had.

The shaft extends longitudinally within the casing and a gear 95 is secured at the center of this shaft. The gear 95 is in constant mesh with a gear 96 which is driven by an electric motor 97. Thus, it is seen that when the motor is operating and the clutch 92 is engaging the pin 94 on the drive shaft, the gear 91 will rotate the gears 92 and 90 through the endless chain 89, whereby the cam shaft 14 is rotated and the spacer roller is actuated. It is pointed out that the gears 82 and 90 are the same size so that the cam shaft 14 will make one complete revolution to operate all three panels in sequence while the spacer roller is actuated only once per revolution a quarter of a turn to bring the next line of indicia on the strip 39 before the window 35.

For keeping the strip taut on the winding roller 46 when the spacer roller is operated, the shaft 47 of said roller (Figures 7 and 4) extends outwardly through one of the end walls and has a collar 98, near its outer end. A pulley 99 made integral with a slidable clutch 100 is mounted on the shaft 47. The shaft has a clutch member 101 secured thereon and a spring 102 which surrounds the shaft and confined between the collar 98 and the pulley 99 normally holds the clutch 100 in engagement with the clutch member 101, whereby rotation of the pulley will rotate the winding roller shaft. The pulley is driven through the medium of a endless spring drive 103 which passes around said pulley and over the pulley 75 which is made integral with the star wheel. Thus, it will be seen that each time the star wheel 76 and the spacer roller control is given a quarter turn, the winding roller 99 is given a quarter turn to take up the slack. The resiliency of the spring drive 103 permits slipping of the winding roller 99 or pulley 75 relative to said spring as taking up of paper increases circumference of said take-up roller. This slipping takes place between the spring drive 103 and surfaces of the members 75 or 99.

From the foregoing, it is obvious that the entire strip 39 may be displayed line by line, each line being displayed successively from left to right. For automatically cutting off the motor after the entire strip or chart 39 has been displayed, through the window, an elongated slot 39' is provided in said strip (Figure 14). This slot is provided near the end of the strip and is alined with a plurality of grooves 41' which are formed in the spacer roller. The grooves are preferably four in number equally spaced around the periphery of the roller.

A flat spring 106 has its forward end rounded and constantly riding on the strip above the spacer roller as said strip travels through the casing. The spring has its rear end secured to a bracket 107 which is fastened to the top of the casing. The spring carries an electrical contact 108 which, when the outer end of the spring is riding on the strip, is in engagement with a contact 109. This latter contact is carried by an arm 110 which is mounted between the spring 106 and bracket 107. The contacts 108 and 109 are connected by lead wire 108' and 109' to the electric motor 97. It is obvious that with the flat spring riding on the strip 39, the contacts remain in engagement and the electrical circuit to the motor is closed.

When the slot 39' passes beneath the flat spring said spring can then fall into one of the grooves 41' in the spacer roller. These grooves are positioned so that one of them will be beneath the spring only when a line of indicia on the strip is before the window. This will prevent stopping the travel of the strip during the rotation of the spacer roller. When the flat spring 106 drops into one of the grooves, the contacts 108 and 109 are separated and the electric motor 97 is stopped, thereby stopping the operation of the entire machine.

When the entire strip has been displayed and the motor has been stopped, it is then necessary to rewind the strip on the supply roller 36 so that said roller can be removed and another roller carrying different indicia on its strip can be inserted. Of course, it would be possible after the rewinding to again display the same strip.

For automatically rewinding the strip on the supply roller, one of the end flanges 13 which extend rearwardly from the front wall and which are hinged on the shaft 14, is secured to a collar 111 (Figure 6) which surrounds the shaft and extends outwardly through the side wall of the casing. When the front wall is swung outwardly the collar is rotated on the shaft 14. The outer end of the collar carries a depending arm 111' which has an outwardly extending pin 112 in its lower end. The pin engages in an arcuate slot 113 in the lower curved end of a vertical bar 114 (Figures 6 and 15) which has its upper end pivoted to a short arm 115 fastened on the outer end of the longitudinal, horizontal shaft 45 on which the friction roller 43 is carried. A coiled spring 116 has one end secured to the arm 115 and its opposite end fastened to the end wall of the casing and normally holds the arm in a lowermost position (Figure 15), whereby the position of the shaft 45 is such that the friction roller 43 is engaging the strip 39, as shown in Figure 4.

When the front door is swung outwardly, the depending arm 111' carried by the collar 111 which is secured to one of the end flanges 13 is also swung. The swinging of the arm 111' raises the vertical bar 114 through the medium of the pin 112 and slot 113, which swings the arm 115 to rotate the shaft 45 in a counter clockwise direction. This rotation of the shaft swings the friction roller arm 44 upwardly to raise the friction roller 43 from the strip, whereby said roller will not interfere with the reverse travel of the strip during rewinding.

As has been pointed out, the electric motor has been stopped by the separation of the contacts 108 and 109 caused by the dropping of the flat spring 106 into the groove 41' of the spacer roller. To close this circuit to utilize the same motor for rewinding, a curved rod 117 has a loop 118 at one end surrounding a set screw 119 which holds a collar 120 on the shaft 45. The other end of the rod is secured to the underside of the flat spring 106 which carries the contact 108. Normally the parts are in the position shown in Figure 11 and the spring is riding on the strip. When the spring drops through the slot 39' in the strip and into one of the grooves 41' of the spacer roller, the loop 118 at the outer end of the rod 117 will compensate for the movement. When the front wall 12 is swung and the shaft 45 rotated, as has been explained, the pin 119 engages the edge of the loop to push the rod 117 forwardly, whereby the flat spring 106 is swung upwardly to engage the contact 108 with the contact 109 to close the electrical circuit to the motor.

To properly shift the gear connections for rewinding a rearwardly extending rod 121 (Figure 16) has its forward end secured to the end flange 13 and its rear end secured to a triangular member 122 which is pivoted to a support 123 extending inwardly from the end wall of the casing. See Figures 16, 19 and 20. The opposite side of the member 122 has one end of a horizontal bar 124 pivoted thereto. This bar extends outwardly through a slot 125 in the end wall and its other end is pivotally connected at 150 to a vertical flanged shifting bar 126 (Figures 6, 7 and 12). The bar is loosely pivoted on a stud 127 on the end wall of the casing. As shown in Figure 7 the bar is inclined so that its upper end engages the clutch 100 made integral with a pulley 99 which drives the winding roller. The flanges at the lower end of the bar pass between the sliding clutch 92 made integral with the drive gear 91 on the drive shaft, and a second sliding clutch 128 mounted on the outer end of the drive shaft. This latter clutch is integral with an enlarged gear 129. The drive shaft has a collar 130 on its end and a coiled spring 131 surrounds the shaft between the collar and the gear 129. A flat spring 132 is secured on the shaft between the collar 130 and the end of the coiled spring and the ends of this spring are curved to frictionally engage the outer face of the large gear 129. It is pointed out that when the gear 129 is idle, as shown in Figure 7 the flat spring 132 will rotate because it is fastened to the drive shaft and its frictional engagement with the face of said gear will tend to rotate that gear. The large gear 129 has connection through a chain drive 133 (Figure 5) with a gear 134 which is mounted to slide on the outer end of the shaft 37 of the supply roller 36 (shown in Fig. 6). A coiled spring 135' surrounding the shaft and confined between the gear and a collar secured on said shaft provides a frictional driving connection between the gear and shaft.

From the foregoing, it is obvious that the large gear 129 on the driving shaft has driving connection with the supply roller shaft. When this gear is idle, the frictional engagement of the revolving flat spring with the face will rotate said gear sufficiently to keep the strip 39 taut between the idler 40 and supply roller 36.

When the front wall 12 of the casing is swung outwardly, as has been explained, to raise the friction roller 43 from the strip and close the electrical circuit to the motor 97, the triangular member 122 is swung rearwardly at the same time (Figure 16) through the rod 121 secured to the end flange of the wall 12. The rearward swinging of the member 122 pulls the bar 124 inwardly which swings the lower end of the shifting bar inwardly. This action of the bar slides the clutch 92 inwardly to disengage said clutch from the pin 94 on the drive shaft, thereby breaking the drive connection. The enlarged gear 129 immediately slides inwardly under the tension of the coiled spring 131 so that its clutch 128 engages the pin 94, whereby the gear 129 will be driven by the drive shaft 93. At the same time that the clutches 92 and 128 are shifting due to the inward swinging of the lower end of the shifting bar 126, the outward swinging of the upper end of said bar slides the clutch 100 out of engagement with the clutch member 101 whereby the drive to the winding roller 46 is disconnected.

Thus it is seen that when the front wall 12 is swung outwardly the drive gear 91 is disconnected which stops rotation of the gears 82 and 90 which drive the spacer roller shaft 42 and cam shaft 14 respectively. At the same time, the winding roller pulley 99 is disconnected and a direct drive from the gear 129 to the gear 134 on the shaft 37 of the supply roller is had. So long as the front wall 12 remains open, the reverse travel of the strip 39 within the casing continues. As soon as the front wall is closed, the parts return to their normal positions.

For automatically regulating the speed of the motor, regardless of the temperature or load or current fluctuation, a governor 135 (Figure 7) is mounted on the motor shaft 97'. The governor comprises a sleeve 136 fixed on the motor shaft and a slidable member 137 also surrounding the shaft and connected with the sleeve by pivoted arms 138 and flat springs 139. When the load on the motor decreases, the speed of the motor shaft increases and the centrifugal force throws the arms 138 outwardly, which causes the outward travel of the slidable member 137 on the shaft.

As the member travels outwardly it strikes a flat spring 140 which carries an electrical contact 141 at its upper end. This contact normally engages a contact 142 to close a direct circuit to the motor 97. When the governor strikes the arm 140, the contacts are separated and the electrical current must then pass through a coil 143 which diminishes the current and lessens the driving power of the motor. Whenever the load increases or the current fluctuates downwardly, the member 137 travels inwardly on the shaft and permits the contacts 141 and 142 to again engage, whereby a direct current is conducted to the motor. Thus, it is obvious that an accurate, positive regulation of the speed of the motor is had at all times.

It is pointed out that any desired indicia may be displayed on the strips. If words or sentences are displayed, such words are shown successively line by line, a portion of a line at a time from left to right. This forces the observer's eyes to follow the matter shown and he becomes trained to follow in a natural way full lines of print, and at an increased speed. The device could also be used in teaching arithmetic. By holding the last panel in-operative, two members may be successively displayed in the other two panels and the pupil asked to give the total or result. Further, the device not only teaches the pupil to read and recognize words instantly, but the exercise also brings about a more flexible condition of the eye muscles.

The description which has been given recites more or less detail of a particular embodiment of the invention, which is set forth as new and useful; however, we desire it understood that it is not limited to such exact details of construction, because it is manifest that changes and modifications may be made, within the scope of the appended claims, without departing from the spirit of the invention.

What we claim and desire to secure by Letters Patent, is:

1. In an educational device, the combination of, a casing having a front wall adapted to swing outwardly from said casing and provided with a window, an exhibitor mounted to travel within the casing and bearing indicia or symbols for display through the window, panels carried by said wall and closing said window, means for operating the panels in sequence, whereby positions of each line of indicia are displayed in sequence, operating means for the exhibitor, and means responsive to the outward swinging of the front wall for automatically stopping the travel of the exhibitor when the wall is swung.

2. In an educational device, the combination of, a casing having a front wall adapted to swing outwardly from said casing and provided with a window, an exhibitor mounted to travel within the casing and bearing indicia or symbols for display through the window, panels carried by said wall and closing said window, means for operating the panels in sequence, whereby portions of each line of indicia are displayed in sequence, operating means for the exhibitor, means responsive to the swinging of the front wall for automatically stopping the travel of the exhibitor when the wall is swung, and means also responsive to the swinging of the wall for rewinding the exhibitor when said wall is swung.

3. A displaying apparatus comprising a casing having a swinging wall provided with a window, an exhibitor mounted to travel within said casing and bearing indicia for display before said window, said exhibitor comprising a flexible member adapted to be unwound from a supply roller and wound onto a receiving roller, power means for driving the receiving roller to wind up said exhibitor and for driving said supply roller at other times, means responsive to the opening of said door for disconnecting said power means from said receiving roller and for automatically driving said supply roller in the reverse direction to rewind said exhibitor on said supply roller.

JAMES Y. TAYLOR.
CARL C. TAYLOR.